United States Patent
Van Krieken et al.

[11] Patent Number: 5,118,917
[45] Date of Patent: Jun. 2, 1992

[54] METHOD OF MICRO-WORKING THE SURFACE OF A WORKPIECE WHILE USING A LASER BEAM

[75] Inventors: Adriaan H. Van Krieken, Brielle; Josephus J. M. Groote Schaarsberg, Delft; Willem De Lange, Capelle a/d Ijssel, all of Netherlands

[73] Assignee: U.S. Philips Corporation, New York, N.Y.

[21] Appl. No.: 477,848

[22] PCT Filed: Jun. 16, 1989

[86] PCT No.: PCT/NL89/00050
    § 371 Date: Nov. 8, 1990
    § 102(e) Date: Nov. 8, 1990

[87] PCT Pub. No.: WO89/12525
    PCT Pub. Date: Dec. 28, 1989

[30] Foreign Application Priority Data
    Jun. 17, 1988 [NL] Netherlands ............ 8801553

[51] Int. Cl.$^5$ ............................................ B23K 26/00
[52] U.S. Cl. ............................ 219/121.66; 219/121.85
[58] Field of Search ............... 219/121.66, 121.85, 219/121.6

[56] References Cited

U.S. PATENT DOCUMENTS 4,684,791 8/1987 Frish et al. ................. 219/121.78
4,839,493 6/1989 Herziger et al. ........... 219/121.85 X Primary Examiner—C. L. Albritton
Attorney, Agent, or Firm—Norman N. Spain

[57] ABSTRACT

A micro-working of the surface is obtained by focussing a laser beam on a surface of a workpiece and subjecting the laser beam and the workpiece to a relative reciprocating movement in which material evaporates from the surface while forming a plasma plume. The relative movement of the laser beam and the workpiece occurs in steps smaller than the diameter of the focus of the laser beam, so that the laser beam moves over the same piece of surface area in an overlapping manner and radiates the same.

4 Claims, 1 Drawing Sheet

METHOD OF MICRO-WORKING THE SURFACE OF A WORKPIECE WHILE USING A LASER BEAM

BACKGROUND OF THE INVENTION

The invention relates to a method of micro-working a surface of a workpiece while using a pulsated laser beam which is directed normal to the surface, and it relates in particular to a method of micro-milling such a surface.

Various methods of surface-working by means of a laser are known in practice. For example, when welding by means of a laser beam the material is made to melt, but deformation of the components to be joined and removal of material do not take place. When drilling and cutting by means of a laser beam, material is removed indeed and is carried away through the cut thus formed. It must be ensured that this way of removing material begins as rapidly as possible, for which purpose a rapid evaporation and discharge of the material are required. For this purpose a high power density, which is not necessarily readjusted afterwards, is required upon initiating the cutting process on the workpiece.

In most forms of laser marking, coding or texturing and in laser radiation for adjusting electronic components, a thin layer of material is removed from very local areas. This very thin layer has a high absorbing power for the laser radiation and backed by underlying carrier layer is of a different material which has a very low absorbing power or which reflects the laser radiation. The radiation time is adjusted so that the underlying different material cannot be attacked by transferred thermal energy. Upon hardening metal surfaces the material is heated at the surface and a transformation hardening is produced. During this hardening at the hardening temperature the material should not melt. In other surface finishing methods, for example, surface alloying of metals (alloying and cladding), the material itself or a deposited layer of material is made to melt and, for example, powders are introduced into the melting pool.

Other methods for the precision working of materials are also known, for example, spark erosion, ultrasonic working and etching. In the case of spark erosion an electrode must be used and only conductive material at the surface can be worked. In this connection the problem occurs that the electrode has to be replaced repeatedly. In ultrasonic methods only a rough finishing is possible and in a micro-working method an electrode on a micro scale is required. In etching only a restricted depth can be reached and the problem of over- and under-etching occurs.

SUMMARY OF THE INVENTION

It is the object of the invention to provide a method for the micro-working or precision working of surfaces of a workpiece of a material, for example, metal, synthetic resin, ceramics, and the like, in which an accurately controllable micro-milling process is possible in a local part of the surface with, if required, a large or a very small depth action, independently of the nature of the material used.

In a method of the type mentioned in the opening paragraph this is achieved in that the laser beam is focussed with respect to the surface in such a manner that the focus of the beam lies near the surface, that the laser beam and the workpiece are subjected to a relative reciprocating scanning movement in such a manner that the said relative movement of laser beam and workpiece occurs in steps smaller than the diameter of the said focus and the laser beam moves over the same piece of surface area in an overlapping manner and radiates the same, and that the pulse duration and power density of the laser beam and the relative movement thereof with respect to the workpiece are adjusted so that the reduction of material at the surface occurs to a very small extent and substantially by evaporation. More particularly the duration of the pulse, the power density of the laser beam and the relative movement are so adjusted that for each pulse a plasma of material vapor or plasma is formed on the surface, which plasma controls the extent of coupling of laser energy to the workpiece. The surface is preheated by the thermal energy produced in the plane resulting in a rise in the temperature of the surface as a result of which rise in temperature the supply of laser energy subsequently applied to the surface may be so sufficiently small that only a very small amount of material occurs, substantially by evaporation.

In this method according to the invention a controlled quantity of material can be removed over a large depth range from depth zero independently of the nature of the material, the process of the said removal being self-controlled.

BRIEF DESCRIPTION OF THE DRAWING

In drawing

DETAILED DESCRIPTION OF THE INVENTION

The invention will now be described in greater detail, inter alia with reference to the accompanying drawing.

An important aspect in the radiation is the so-called preheating of the material. In the standard processes, for example, drilling and cutting, an overdose of energy is required. At the beginning of the pulse a large part of the light is reflected. However, at the instant a vapour or plasma is formed, the absorption/coupling increases considerably. As a result of this the drilling and cutting process, respectively, can be considerably accelerated and in drilling and cutting, respectively, this is not serious since the energy disappears through the aperture formed.

In micro-working or micro-milling a restricted and controlled quantity of supplied energy must be absorbed and this process is considerably improved by preheating the material. The result of the preheating of the material is that only a small temperature difference has to be bridged in order for the surface part to begin to evaporate locally. In this manner only small energy packets are necessary for a very small reduction in material. A further advantage is that the absorption probably increases at higher temperature and a higher absorption in the solid state gives a more homogeneous absorption during the process. As a result of this the use of high peak powers, only for coupling, are superfluous. The relatively higher power densities which are necessary to remove the material at each pulse predominantly by evaporation may consequently be lower.

According to the invention the said manner of preheating is obtained by a rapid reciprocating movement of the laser beam over the surface. This is done in steps which are smaller than the diameter of the said focus as a result of which the laser beam moves in an overlapping manner over the same part of surface and radiates the same. The position of the focus is then varied in a given manner and according to a given recipe and the average position of the workpiece with respect to the focus follows the desired rectilinear or curvilinear path in the direction of or perpendicularly to the reciprocating movement.

FIGS. 1a to 1d show a few examples of the rapid reciprocating movement and of the slower forward major movement.

In this case the depth of the micro-working or micromilling is determined by the number of times the reciprocating movement passes over the same part of the surface with readjustment of the location of the focus with respect to the original surface. The focus must follow the surface part to be worked.

Figure 1A:
FIGS. 1a, 1b, 1c and 1d are for scanning patterns
Figure 1B:
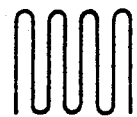
Figure 1C:
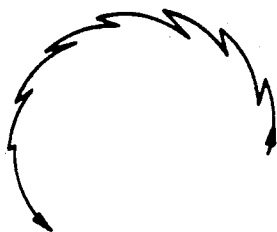
Figure 1D:
Figure 2:
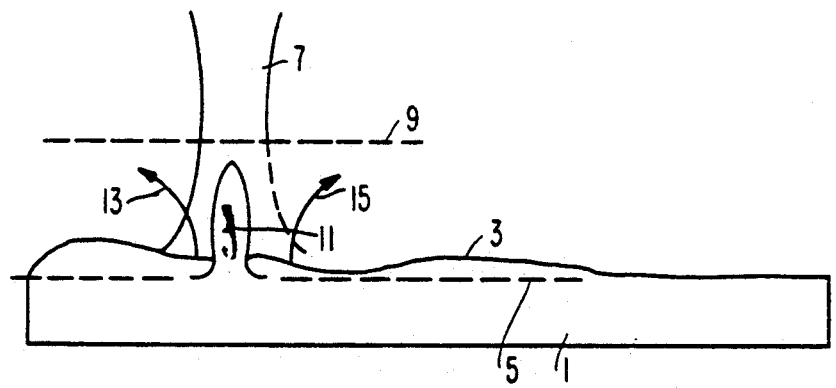
FIG. 2 is a diagrammatic view of the elevation of the plasma formed during radiation.

The presence of a plume in the micro-working mentioned hereinbefore, as shown in FIG. 2, is of very great importance. FIGS. 1a–1d are scanning patterns of the major movement of the focus of the laser beam on the workpiece along with the more rapid reciprocating movement of the laser beam over the surface of the workpiece. In FIG. 2, a workpiece 1 with surface 3 is to be a micro-milled to a level 5. For this purpose a laser beam 7 having a focus plane 9, lying a few millimeters above the level 5, is directed to the surface 3. As a result of the radiation with the laser beam 7 a plume 11 of material vapor and/or plasma is generated. Material of the workpiece is removed by evaporation in direction 13 and 15. The plume, consisting of material vapor, and/or plasma absorbs a considerable part of the laser light and this will become larger if as a result of the preheating in the preceding pulse the surface temperature and evaporation of the workpiece increase. The remaining part of the laser light is absorbed in the material. As a result of the said preheating the temperature difference to the desired working temperature becomes smaller than the supply of a subsequent energy packet will suffice to raise the temperature at those areas where the surface is radiated again to such an extent that evaporation and hence a small quantity of material removal occurs.

Therefore, the plume forms as it were a self-controlling element of the extent of coupling in which the laser radiation is partly absorbed in the plume and a self-controlling working depth is formed. If more energy is introduced in the resulting equilibrium, the surface temperature and evaporation will increase as a result of which the dimensions of the plume also increase and as a result of which the quantity of energy which reaches the workpiece will decrease. As a result of this the evaporation will decrease, etc. When insufficient metal vapour is developed, the plume hence disappears. As a result of this the plume may be used to control the process. The plume ultimately extinguishes after each pulse. Less material is evaporated with each subsequent pulse and hence there is less absorption by the plume which becomes smaller and smaller until the process stops. The high gas pressure in the plume has a smoothing effect on the surface of the material.

For carrying out the accurate micro-working in the presence of a plume, the focus of the laser beam will have to lie in or near the surface of the workpiece. For example, in order to make a hole having a flat bottom, the focus will have to lie a few millimetres above the said bottom. This distance should be such that at this distance as a result of the low energy density and the plume no or substantially no material is removed.

As a result of the self-controlling effect of the plume it is possible to perform a micro-working or milling process down to a previously determined depth. For this purpose the focus of the laser beam is adjusted to a depth below the surface of the workpiece determined by the process. Spatially, the focus during the radiation remains at the same height and the material removal continues until the surface of the worked piece of surface has come at such a depth below the focus that the evaporation of material and the removal of material becomes less and less and stops entirely.

The desired relative movements of workpiece and laser beam can be realised mechanically at the workpiece table or optically by means of a mirror-controlled laser beam or by a combination of the two. The so-called recipe for the control program provides that there be a repeated radiation of a piece of surface area by a reciprocating relative movement of the laser beam with respect to the surface of the material. This relative movement of the laser beam and the work-piece is always such that it is smaller than the diameter of the focussed laser beam.

As stated hereinbefore, a pulsated laser, for example, a Nd-YAG laser or any other suitable laser, may be used with a power density on the surface of $\sim 100$ MW/cm$^2$ which is so high that the laser energy readily couples into the material. The duration of the laser pulse is been chosen to be so that sufficient energy is supplied to evaporate a small quantity of material. The pulse duration is also sufficiently short, namely 0.2 to 3 msec., to prevent adjacent material from being heated by heat transfer so that it starts melting. The pulse energy used lies in a range from 0.05 to 1 J.

The micro-working or milling can be carried out, for example, in three steps: (the indicated values are an example of using a Nd-YAG laser)

1. a rapid pre-working step with a pulse duration of approximately 3 msec, a pulse energy of approximately 1 J, and a heating rate of heating the pulse recurrence frequency of approximately 40 Hz. Here much thermal energy is supplied in a short period of time and a depth of 1 mm/min can be obtained and a surface area of 15 mm$^2$/min.

2. a working step with a pulse duration of 0.2 to 0.3 msec, a pulse energy of approximately 0.05 J, and a pulse recurrence frequency of approximately 100 Hz. The depth to be removed can be readjusted to substantially zero. The working velocity in the this step may be, for example, 0.15 mm$^3$/min.

3. an after-working step: for making truly smooth the workpiece in which working is done with a pulse duration of approximately 3 msec., a pulse energy of approximately 0.8 J and a pulse recurrence frequency of approximately 50 Hz.

The invention may be used in particular for producing continuous holes, blind holes, slots or grooves of previously determined shapes and dimensions, and surface structures in metal, synthetic resins or ceramics. The invention may be used notably in manufacturing processes of tools, moulds, dies and high-precision component parts.

We claim:

1. A method of micro-working a surface of a workpiece of a material while using a pulsated laser beam which is directed to the surface, in which the laser beam is focussed onto the surface of the material, characterized in that,
a) the focus of the laser beam is adjusted to be near the surface,
b) the laser beam and the workpiece are subjected to a relative reciprocating scanning movement with a relative movement in steps which are smaller in one of the directions of movement than the diameter of the said focus, the laser beam moving over the same piece of surface area in an overlapping manner and radiating the same piece of surface area,
c) the pulse duration and power density of the laser beam and said relative movement are adjusted so that with each pulse a plume of material vapour and/or material plasma is formed on the surface and controls the extent of coupling of energy, and said laser energy being partly absorbed, the surface being preheated by the thermal energy produced in the plume so that as a result of the rise in temperature thereof the subsequent supply of laser energy be sufficiently small for a very small removal of material occurring substantially by evaporation.

2. A method as claimed in claim 1, characterized in that in the said scanning movement the plume is used as a self-controlling element in such a manner that the focus, depending on the desired micro-working is adjusted at a depth below the surface and, spatially, is held there while the radiation continues until the piece of surface area worked on comes at such a depth below the focus that the evaporation of the material becomes less and less and stops entirely.

3. A method as claimed in claim 1, wherein the shape of the surface which has been worked and the speed at which the surface is worked is determined by a movement recipe formed by a rectilinear or curvilinear movement of the focus of the laser beam on the surface of the workpiece in relation to said step-wise reciprocating movement of the laser beam and the workpiece relative to each other.

4. A method of micro-working a surface of a workpiece of a material while using a pulsated laser beam which is directed to the surface, in which the laser beam is focussed onto the surface of the material, characterized in that,
a) the focus of the laser beam is adjusted to be near the surface,
b) the laser beam and the workpiece are subjected to a relative reciprocating scanning movement with a relative movement in steps which are smaller in one of the directions of movement than the diameter of said focus, the laser beam moving over the same piece of surface area in an overlapping manner and radiating the same piece of surface area,
c) the pulse duration and power density of the laser beam and said relative movement are adjusted so that with each pulse a plume of material vapour and/or plasma is formed on the surface and controls the extent of coupling of laser energy, and said laser energy being partly absorbed, the surface being preheated by the thermal energy produced in the plume so that as a result of the rise in temperature thereof the subsequent supply of laser energy may be sufficiently small for a very small removal of material occurring substantially by evaporation, and
d) the laser is a Nd-YAG laser, the pulse duration is 0.2-3 msec, the pulse energy is about 0.05-1 Joule, and the pulse recurrence frequency of the pulsated laser beam is about 30-100 Hz.

* * * * *